(12) United States Patent
Patel

(10) Patent No.: US 9,967,308 B2
(45) Date of Patent: May 8, 2018

(54) SYSTEM AND METHOD FOR FAULT MANAGEMENT IN A SERVICE-ORIENTED ARCHITECTURE

(75) Inventor: Rikin S. Patel, Sterling Heights, Macomb County, MI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 4129 days.

(21) Appl. No.: 10/729,607

(22) Filed: Dec. 5, 2003

(65) Prior Publication Data
US 2005/0125555 A1 Jun. 9, 2005

(51) Int. Cl.
*G06F 15/173* (2006.01)
*H04L 29/08* (2006.01)
*H04L 29/14* (2006.01)

(52) U.S. Cl.
CPC .............. *H04L 67/02* (2013.01); *H04L 69/40* (2013.01)

(58) Field of Classification Search
CPC ................................. H04L 7/02; H04L 69/406
USPC ......................................... 709/238, 239, 240
See application file for complete search history.

(56) References Cited

U.S. PATENT DOCUMENTS

| 6,757,850 B1* | 6/2004 | Lehner ............................ 714/48 |
| 7,146,544 B2* | 12/2006 | Hsu et al. ........................ 714/57 |
| 2004/0039964 A1* | 2/2004 | Russell et al. .................... 714/25 |
| 2004/0230650 A1* | 11/2004 | Vambenepe et al. ......... 709/204 |
| 2004/0237094 A1* | 11/2004 | Vambenepe et al. ......... 719/328 |
| 2005/0015472 A1* | 1/2005 | Catania et al. ............... 709/223 |
| 2005/0065879 A1* | 3/2005 | Birch et al. ...................... 705/40 |
| 2005/0172306 A1* | 8/2005 | Agarwal et al. .............. 719/328 |

* cited by examiner

*Primary Examiner* — Glenford Madamba
(74) *Attorney, Agent, or Firm* — Trop, Pruner & Hu, P.C.

(57) ABSTRACT

A system and method of fault management includes receiving a service request, encountering a fault in during the execution of the service request, persisting the fault, and providing a fault response.

43 Claims, 3 Drawing Sheets

SYSTEM AND METHOD FOR FAULT MANAGEMENT IN A SERVICE-ORIENTED ARCHITECTURE

TECHNICAL FIELD OF THE INVENTION

This invention relates generally to the field of fault management, and more particularly to a system and method for managing faults in a service-oriented architecture.

BACKGROUND OF THE INVENTION

Managing faults in a service-oriented architecture is often a difficult process. For example, today's system architectures often employ numerous resources that are coupled over an intranet, local area network, wide area network, or even the World Wide Web or Internet. Accordingly, managing information concerning the source of faults within the system architecture, and/or the cause of the faults themselves within a system can be very difficult.

In addition to the difficulty associated with managing faults in a service-oriented architecture, many companies are now, or will soon be, providing services over networks using web service language. Web service language is generally defined as a "web service description" language (WSDL) which may be any uniform computer language for use in conjunction with the Internet or other network approved by the World Wide Web Consortium (W3C) such as RPC, HTTP, JMS, or other language registered in a Universal Description Discovery and Integration registry. The difficulty in managing faults when web service languages are used generally rests in the fact that individual system architectures, and possibly individual systems within any given architecture, operate in languages other than web service languages, often a proprietary language or protocol. Thus, a system must translate any service request received in a web service format into the actual computer language used by the system providing the service.

SUMMARY OF THE INVENTION

In accordance with various embodiments of the present invention, difficulties in fault management for a service-oriented architecture may be reduced or eliminated. In one embodiment, a method for managing faults in a service-oriented architecture includes receiving a service request in a web service language, executing the service request, persisting any faults encountered during the execution of the service request, and providing a fault response. This embodiment may include a translation to a non-web service language, and/or providing the fault response in a web service language.

Another embodiment includes a system for managing fault in a service-oriented architecture. This embodiment includes a service interface, a service implementation, a persistent store, and a fault service interface. This embodiment may also include a service implementation coupled to the fault service interface. Yet another embodiment includes a web service module to manage service requests, a diagnostic module to fulfill the service request and identify faults in the system, and a fault persistence module to store the faults encountered during the execution of the service request.

An advantage of an embodiment of the present invention allows for uniform fault management in a system accessed by any service consumer operating in a web service language. Yet another advantage is the ability of the system to identify and/or diagnose faults as they occur in the system, and to persist them for future reference.

Certain embodiments of the invention may include none, some, or all of the above advantages. One or more other advantages may be readily apparent to one skilled in the art from the figures, descriptions, and claims included herein.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE DRAWINGS

Service-oriented architectures may be generally defined as any system architecture capable of providing services over a network. Examples of networks used in system-oriented architectures may be the Internet, the World Wide Web, local area networks (LANs), wide area networks (WANs), metropolitan area networks (MANs), wireline, optical networks, wireless, or any other network. Generally, a service-oriented architecture allows a user to invoke a service through the network. In some situations, a user may access the service-oriented architecture over the network to request the service provider, which may be the administrator of the service-oriented architecture such as a business or business entity, government agency, individual, or other type of service provider to fulfill the service request requested by the user. Often, a user may be operating in a computer language or protocol that differs from that of the service-oriented architecture. In this instance, the user and the service provider may be considered to be a loosely-coupled network. In order to provide more streamlined and efficient communication between loosely coupled entities, organizations such as the World Wide Web Consortium (W3C) and other registries have begun to implement uniform protocols for communicating between loosely coupled entities over a network. These uniform protocols, called web services, are self-contained business functions that operate over the Internet, or other networks. Web services are an important component of future business development, due primarily to the ability of web services to allow companies and other entities to communicate via networks using a common computer language or set of protocols.

A key aspect of managing a service-oriented architecture utilizing web services is the ability to effectively manage faults that arise when a service is being performed. Faults, or error conditions, may occur during the fulfillment of any service requests initiated by user over a network to a web service architecture. Errors occurring on the web service architecture system may be referred to as "server-side" errors, and may occur due to any number of conditions being present in the server-side, or web service architecture. Such errors may include an error within a system required to perform the service requested by the user, an erroneous client request or user request (which may include formatting errors, misspelled or improperly formatted requests), network or sub-network outages, or any number of other difficulties which may arise when invoking service from a system architecture. These errors must be tracked and addressed in order to prevent system failure and to continue to provide services to consumers requesting services from the service-oriented architecture.

Figure 1:
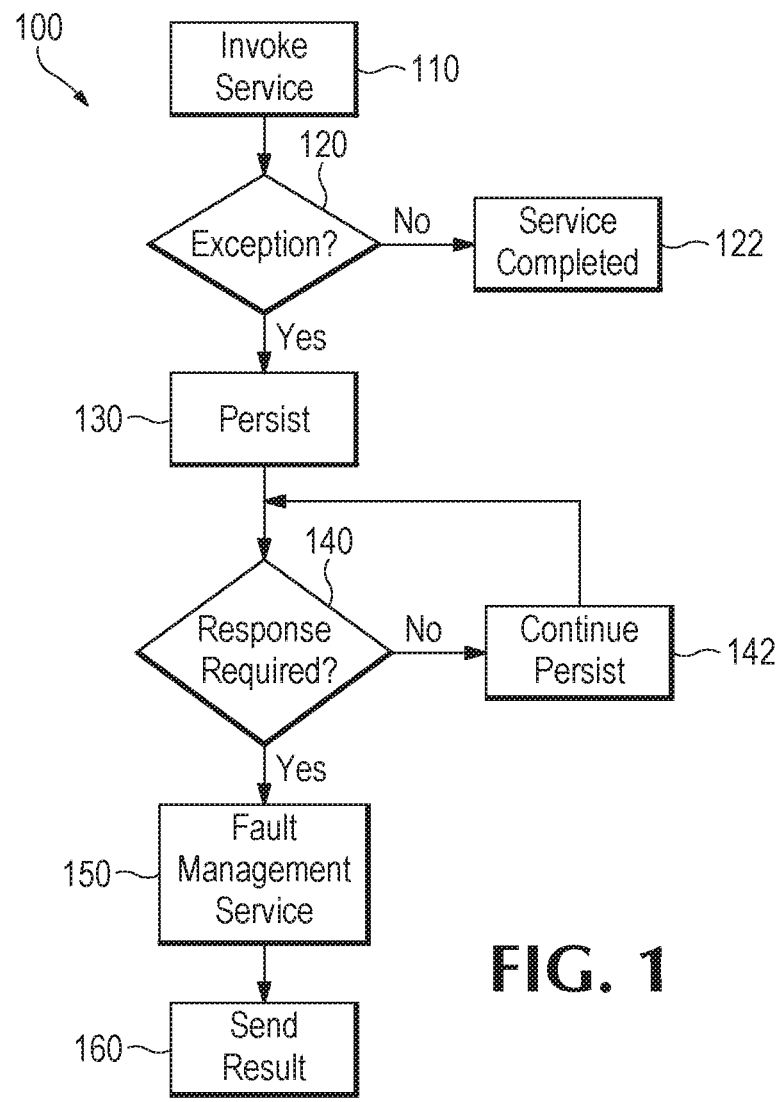
FIG. 1 is a flowchart illustrating a method according to the present invention.

FIG. 1 illustrates a method for managing faults in a service-oriented architecture. At step 110, service is invoked by a service consumer. The service consumer may be internal to the system architecture, or may be an external consumer accessing the system architecture via a network. The service consumer preferably invokes the service at step 110 utilizing a web service description language (WSDL). Continuing with step 110, when a service provider receives the service request it preferably begins to fulfill the service request invoked by the service consumer. At step 120 the system may encounter a fault or exception. If at step 120 there is no fault or exception encountered, at step 122 the service is completed according to the service request by the service consumer at step 110. If, at step 120, a fault or exception is encountered, at step 130 that fault is persisted through the system. Fault persistence may include labeling the fault with a unique identifier such as a fault number, or letter number combination, for persistence through the system. At step 130, the fault is preferably persisted into a persistent data store such as a database that would preferably be coupled to a network, but in any event will be at least coupled to the system tracking the faults within the service-oriented architecture. In any given embodiment, the persistent store may be dedicated or integrated with other data storage requirements of the architecture.

At step 140, the system determines whether a response is required for the fault that has been persisted at step 130.

If the service invoked at step 110 requires a response upon being fulfilled, the response would include the fault information in addition to any of the service information that is provided other than the information that caused the fault to occur within the system. If, for example, at step 140 no response is required, the system may continue to persist the fault at step 142 until a response is required, if ever. An example of when a fault response may not be required immediately upon discovering the fault could occur when the service consumer invoking the service at step 110 is a system or subsystem within the service-oriented architecture itself. Additionally, a fault response may not be required until requested by a fault service consumer. Fault service consumers may be any entity, individual or system, either internal or external, requesting fault information. Accordingly, at any later date a user may be able to access the architecture to determine where any or all of the faults occurring in this service-oriented architecture originate from, or what the cause of the faults might be attributed to, in order to improve the service provided by the service-oriented architecture or to repair systems that have failed or consistently fail within the service-oriented architecture.

The system may implement the fault management service at step 150. The fault management service may include translating the fault information to or from a WSDL, querying the persistent store to determine the source of faults from a particular sub-system within the service-oriented architecture, or any other fault management service required by the system-architecture, or the service request invoked by the service consumer at step 110. For example, a fault response may be automatically required to be given to the service consumer. Alternatively, a fault response may be provided to an internal system such as a repair system, or fault management tracking system, that allows the system to identify problems within the system architecture or systems within the architecture that consistently fail. Additionally, the fault management service invoked at step 150 may be operable to format a response in a WSDL to be sent to another entity such as the service consumer, or a fault service consumer if the fault service consumer is different from the service consumer. A fault service consumer may be different from the service consumer in any number of situations. For example, the fault service consumer may be the original service consumer, a unique fault service consumer, an internal sub-system, an automated function of the architecture, or any other requestor of fault information. Step 150 may also be accomplished by sending a WSDL-formatted response to other systems within the service-oriented architecture. In yet another embodiment, sending results at step 160 may include transmitting a fault response translated into a computer language or protocol requested by the service consumer in the invocation of service at step 110.

Figure 2:
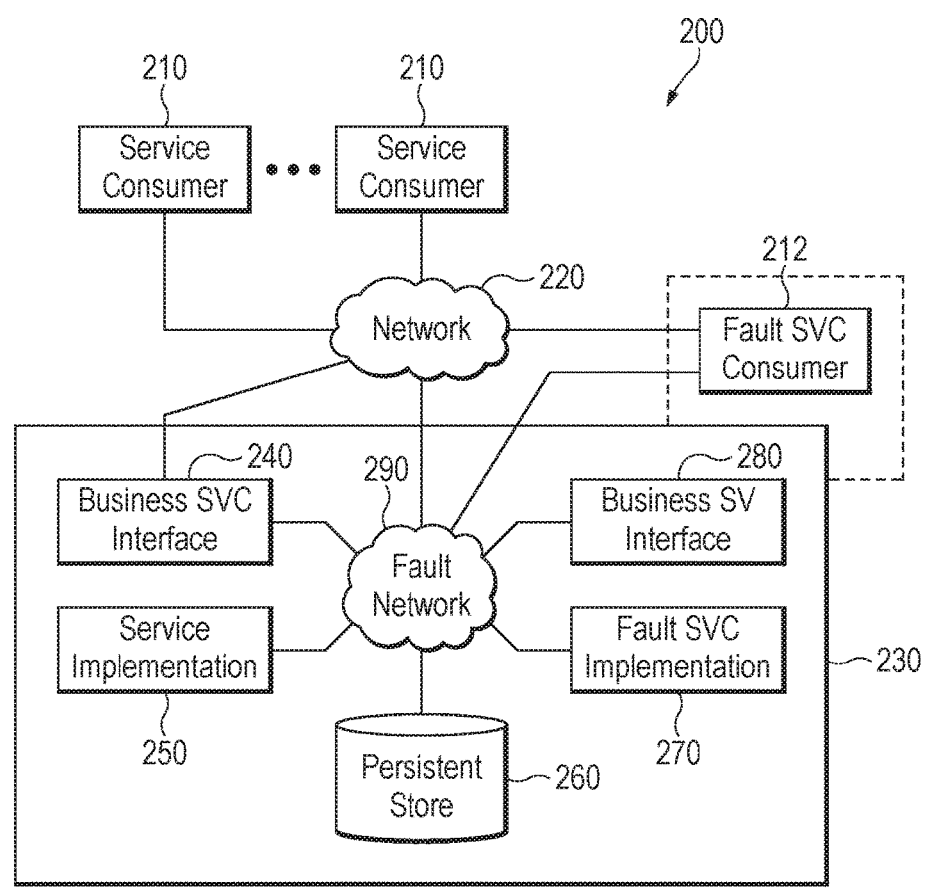
FIG. 2 is a fault management system in accordance with an embodiment of the present invention.

FIG. 2 illustrates a system 200 for managing faults within a service-oriented architecture. System 200 may include one or more service consumers 210 coupled to a network 220. Service consumers 210 may be individuals, businesses, or other entities desiring services from a service-oriented architecture. Architecture 230 is preferably coupled to network 220 and may include the following components: business service interface 240, service implementation 250, persistent store 260, fault service implementation 270, fault service interface 280, and fault network 290. Fault network 290 may be a LAN, MAN, WAN, wireless, wireline, optical, or, in the case of a system architecture spread over larger distances, a portion of the Internet. Additionally, fault network 290 may be unnecessary if other components present in the system architecture are coupled to network 220, which may be the Internet, the World Wide Web, intranet, LAN, MAN, WAN, wireline, wireless, optical, or any other type of network. Additionally, a fault service consumer 212 may be coupled to network 220, or may be an internal subsystem of architecture 230.

In one embodiment, a service consumer 210 invokes a service via network 220 from architecture 230. Architecture 230 may be any type of service provider, such as a business, corporation, group of businesses, affiliated businesses, or government entities, or any other service-oriented architecture capable of providing services over a loosely coupled integrated network. Upon invoking a service by architecture 230, the service request by service consumer 210 is preferably directed to the business service interface 240. In one embodiment, the service request is received by the business service interface in a web services description language (WSDL), such as remote procedure call (RPC), hypertext transfer protocol (HTTP), Java message service (JMS) or any other WSDL that is registered in a universal description discovery and integration (UDDI) registry. However, in other embodiments, the service request from service consumer 210 may be transmitted in a proprietary language used by architecture 230 or in any language capable of interpretation by architecture 230.

Upon receiving the service request, business service interface 240 preferably translates the message, if necessary, from the WSDL into the operating protocol or language of the service architecture 230. However, system architecture 230 may also be configured to operate within a WSDL, thereby obviating the need for business service interface 240 to translate the service request from a WSDL. Additionally, business service interface 240 may be operable to translate the service request into a WSDL other than the WSDL used by the service consumer 210 to transmit the original service request. For example, the service request may be received as an HTTP and translated into an RPC or a JMS, among others. In such a case, architecture 230 may operate solely in a WSDL thereby streamlining the service response and service management by reducing the need to translate between different computer or network languages and protocols.

Once business service interface 240 has translated and/or processed the service request from service consumer 210, it may transmit the request to service implementation 250 via fault network 290. In one embodiment, service implementation 250 may be resident on the same server, computer system, or other system, thus enabling the service request to be accessed by service implementation 250 without transmitting the request via fault network 290. Once service implementation 250 receives the service request, it directs the service request to the appropriate subsystem coupled to architecture 230 to fulfill the service request (not explicitly shown). As an example only, and not by way of limitation, service consumer 210 may request a price quote on a consumer item. Upon receiving the service request, system architecture 230 may direct the service request to a consumer pricing system coupled to architecture 230 in order to fulfill the service request. Upon receiving the request, the consumer pricing service subsystem preferably responds with the information requested to architecture 230. However, due to any number of possibilities, a fault may occur in either the format of the request by the service consumer, the system required to provide the consumer price by the consumer pricing subsystem, the inability of the system architecture 230 to properly transmit the service request, or any other type of error which prevents the fulfillment of the service request.

Upon determining that an error, fault, or exception has occurred in the fulfillment of the service request, service implementation 250 preferably persists the fault by directing the fault information to be stored in persistent store 260. In addition to directing the storage of the fault information in persistent store 260, service implementation 250 may label the fault information with a unique identifier that makes accessing fault information easier to accomplish. Labeling each individual fault response with a unique identifier may allow the fault responses to be categorized in any number of ways. For example, the fault information may be categorized by the source of the fault, through either a sub-system or network location, such as an internet protocol (IP) address, or it may be stored by the type of fault, such as a request time-out, a system, or sub-system failure, or any combination of fault sources or locations that assist service implementation to effectively catalog the fault information in persistent store 260.

Architecture 230 may include one or more fault service interfaces 280. Fault service interface 280 is preferably operable to translate any fault responses, if required, for transmission to a fault service consumer 212. Alternatively, if architecture 230 operates solely in a WSDL format or protocol, the translation, and/or transmission functions performed by fault service interface 280 may be performed by fault service implementation 270. Additionally, fault service consumer 212 may be an entity located within architecture 230, or may be an entity or system located outside of architecture 230, such as a service consumer 210. Fault service consumer 212 may also be any other entity requesting fault response information from architecture 230, in order to improve service of the service-oriented architecture, or to maintain or track faults occurring within architecture 230.

Figure 3:
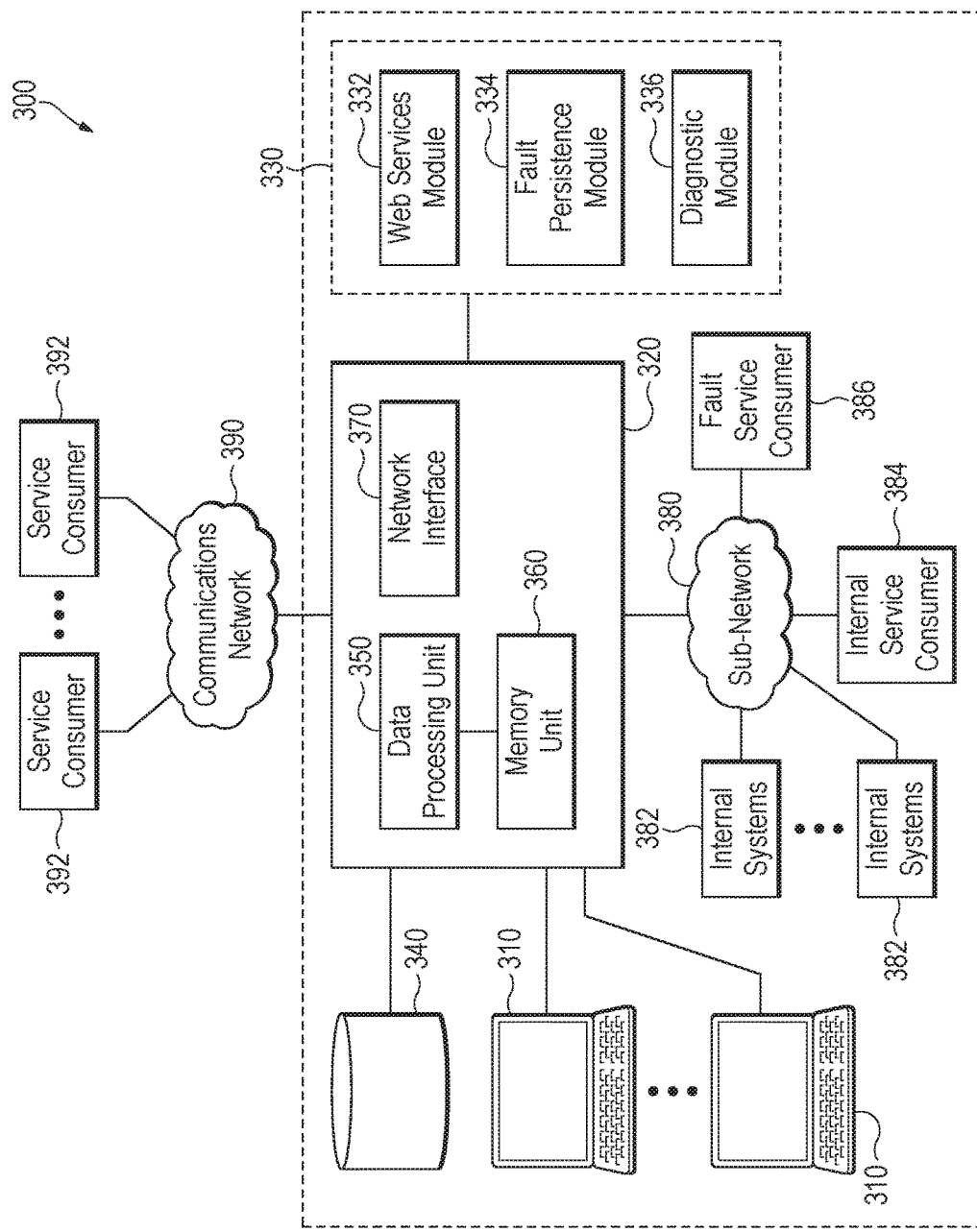
FIG. 3 is a fault management system in accordance with an embodiment of the present invention.

FIG. 3 illustrates a system 300 for fault management for a service-oriented architecture. System 300 may include components of system architecture 302 having one or more operator terminals 310, a data management system 320, one or more function modules 330, and a database or persistent store 340. System architecture 302 may also have other components not illustrated in FIG. 3. The various components may be located at a single site or, alternatively, at a number of different sites. The components of system architecture 302 may be coupled to each other using one or more links, each of which may include one or more computer busses, local area networks (LANs), metropolitan area networks (MANs), wide area networks (WANs), portions of the Internet, or any other appropriate wireline, optical, wireless, or other links. An operator terminal 310 may provide an operator access to data management system 320 to configure, manage, or otherwise interact with data management system 320. An operator terminal 310 may include a computer system (which may include one or more suitable input devices, output devices, processors and associated memory, mass storage media, communication interfaces, and other suitable components) or other suitable device.

Data management system 320 may manage data associated with service requests received via communications network 390 from service consumers 392. The functions performed by data management system 320 may in particular embodiments include fulfilling service requests, identifying exceptions in the performance of service requests such as errors or faults, providing fault responses, and persisting faults discovered during the performance of service requests, among others. These functions may be performed automatically, or in response to data entered or received via operator terminals 310, or from any number of internal systems 382, an internal service consumer 384, or a fault service consumer 386 which may be coupled to a sub-network 380 that is coupled to data management system 320. Data management system 320 may include a data processing unit 350, a memory unit 360, a network interface 370, and any other suitable components for managing data associated with the system architecture. The components of data management system 320 may be supported by one or more computer systems at one or more sites, such as internal systems 382, internal service consumer 384, or false service consumer 386. One or more components of data management system 320 may be separate from other components of data management system 320, and one or more suitable components of data management system 320 may, where appropriate, be incorporated into one or more other suitable components of data management system 320. Data processing unit 350 may process data associated with service requests, and in particular, faults associated with service requests. This data processing may include executing coded instructions (which may in particular embodiments be associated with one or more function modules 330). Memory unit 360 may be coupled to data processing unit 350 and may include one or more suitable memory devices, such as one or more random access memories (RAMs), read-only memories (ROMs), dynamic random access memories (DRAMs), fast cycle RAMs (FCRAMs), static RAMs (SRAMs), field-programmable gate arrays (FPGAs), erasable programmable read-only memories (EPROMs), electronically erasable programmable read-only memories (EEPROMs), micro-controllers or micro-processors. Network interface 370 may provide an interface between data management system 320 and communications network 390 and/or sub-network 380 such that data management system 320 may communicate with service consumers 392, internal systems 382, internal service consumer 384, fault service consumer 386, or other entities coupled to communication network 390 or sub-network 380.

A function module 330 may provide particular functionality associated with handling service requests or handling transactions in a web service description language (WSDL) according to system 300. As an example only, and not by way of limitation, a function module 330 may provide functionality associated with web services, fault persistence, and diagnostics. A function module 330 may be called by data management system 320 (possibly as a result of data received from an operator terminal 310), a service consumer 392, an internal service consumer 384, a fault service consumer 386, or an internal system 382, and, in response, provide the particular functionality associated with function module 330. A function module 330 may then communicate one or more results to data processing unit 350 or one or more other suitable components of data management system 320, which may use the communicated results to create, modify, or delete one or more data files associated with one or more service requests, provide data to an operator at an operator terminal 310, or a service consumer 392, a fault service consumer 386, an internal system 382, or an internal service consumer 384 or perform any other suitable task. Function modules 330 may be physically distributed such that each function module 330, or multiple instances of each function module 330, may be located in a different physical location geographically remote from each other and/or from data management system 320. In the embodiment shown in FIG. 3, function modules 330 include a web services module 332, a fault persistence module 334, and a diagnostic module 336.

According to one embodiment of system architecture 302, a service consumer 392 or an internal service consumer 384 may establish communication with data management system 320 via communications network 390 or sub-network 380, respectively, to request a service to be performed by system architecture 302 or an internal system 382, or any combination thereof. The service request may be any request capable of being fulfilled by system architecture 302 or any of the internal systems 382, or any system coupled to data management system 320 or any of the internal systems 382, or any systems coupled to sub-network 380. Upon receiving the service request, data management system 320 preferably calls on web services module 330, in the case of a request received in a WSDL, to translate the service request into the language typically used by the system architecture 302. In any given embodiment, the language employed by system architecture 302 may be a WSDL, or any other computer-readable protocol or language used to execute commands within system architecture 302. Accordingly, web services module 332 is preferably operable to translate any incoming service requests into a language or protocol necessary to fulfill the requests according to the specifications of system architecture 302. Upon receiving the request in usable form, data management system 320 preferably directs the request to any one or multiple internal systems 382 to fulfill this service request. An example of a service request could be an order to purchase an item, a system search for information located within system architecture 302, or a service request from a system coupled to system architecture 302 (not explicitly shown).

As the service request is being fulfilled, various system exceptions, or faults, may be encountered. Upon encountering an exception in the execution of the service request, fault persistence module 334 preferably directs the information regarding the fault to be stored in database 340, which also may be referred to as a persistent store 340. In addition to storing fault information, fault persistence module 334 preferably labels the fault information for each service request with a unique identifier that enables the fault information to be readily retrieved from persistent store 340 by data management system 320. A diagnostic module 336 may be present in system architecture 302 that identifies the source of any exceptions encountered during fulfillment of the service request, or, alternatively, to identify the location of any subsystems or internal systems within system architecture 302 that caused an exception, or any system coupled to system architecture 302 that was the source of the exception.

In addition to directing data management system 320 to store fault information in persistent store 340, fault persistence module 334 may also be operable to fulfill fault service requests from a fault service consumer 386. Fault service consumer 386 may be an internal system 382 coupled to sub-network 380, a service consumer 392 accessing system architecture 302 via communications network 390, or an internal service consumer 384 accessing data management system 320 for a particular service. Upon receiving a fault service request, fault persistence module 334 preferably retrieves the fault information from the service request that it contained the exception from persistent store 340. Additionally, web services module 332 may be called upon by data management system 320 to translate the fault information into a WSDL, or other language readable by fault service consumer 386. Alternatively, fault service consumer 386 may be a dedicated fault system that catalogs and tracks all faults located or occurring within system architecture 302 or any system coupled thereto. In such a case, fault service consumer 386 may include a console or other computer generated display that allows the tracking and servicing of information generated through fault persistence in architecture 302.

Preferably, fault persistence module 334 is operable to selectively incorporate different aspects of fault information retrieved from persistent store 340 according to the specifications of system architecture 302. For example, the administrator of system architecture 302 may desire to provide different information to different fault service consumers based on the association of the fault service consumer with the service provider administering system architecture 302. Thus, for a fault service consumer located within system architecture 302, more information may be provided than to an external fault service consumer such as an auditor or a service consumer 392 acting as a fault service consumer.

Although the present invention has been described in detail, it should be understood that various changes, substitutions, and alterations may be made, without departing from the spirit and scope of the present invention as it is defined by the claims.

What is claimed is:

1. A method for managing faults in a web service architecture comprising:
    receiving, from a first service consumer, a service request in a web service language, wherein the service request comprises invoking a service over a network;
    translating the service request into a non-web service language;
    executing the service request;
    encountering an exception during the execution, wherein the exception comprises a fault;
    without responding to the fault, storing fault information to persist the fault; and
    in response to a request from a fault service consumer, providing a particular level of a plurality of different levels of the stored fault information to the fault service consumer, wherein the fault service consumer is different from the first service consumer, wherein the particular level of the plurality of different levels is selected based on one or more characteristics of the fault service consumer.

2. The method of claim 1, wherein persisting the fault comprises labeling the fault with a unique identifier.

3. The method of claim 1, comprising storing the fault in a database.

4. The method of claim 3, further comprising storing multiple faults in the database, the storage comprising storing fault information.

5. The method of claim 4, further comprising providing a fault response, wherein providing the fault response comprises providing access to the database, the access operable to permit a user to track any fault stored in the database.

6. The method of claim 5, wherein providing the fault response further comprises presenting the fault information in a console, the console operable to list the fault information stored in the database.

7. The method of claim 1, wherein the one or more characteristics of the fault service consumer include a type of association of the fault service consumer with the system.

8. The method of claim 1, wherein the one or more characteristics include a location of the fault service consumer.

9. The method of claim 1, further comprising translating the fault information into a web service language.

10. A system for managing faults in a service-oriented architecture comprising:
a hardware processor;
a service interface, executable by the hardware processor, to:
receive, from a first service consumer, a service request via a network, the service request received in a web service language; and
translate the service request into a non-web service language;
a service implementation coupled to the service interface, the service implementation to perform the service request and determine the source of any fault encountered in the performance;
a persistent store to store fault information for a fault encountered in the performance without responding to the fault; and
a fault service interface to, in response to a request from a fault service consumer, transmit a particular level of a plurality of different levels of the stored fault information to the fault service consumer, wherein the fault service consumer is different from the first service consumer, wherein the particular level of the plurality of different levels is selected based on one or more characteristics of the fault service consumer.

11. The system of claim 10, further comprising a fault service implementation coupled to the fault service interface, the fault service interface operable to retrieve the fault information from the persistent store.

12. The system of claim 11, wherein the fault service interface is further to receive the request from the fault service consumer in a web service language, and to translate the request from the fault service consumer into a non-web service language.

13. The system of claim 11, further comprising a fault network coupled to the network, the fault network operable to couple the service interface, service implementation, persistent store, and fault service interface.

14. The system of claim 11, wherein the fault service implementation is further operable to translate the fault information into a web service language.

15. The system of claim 11, further comprising a console, the console operable to display fault information retrieved by the fault service implementation.

16. The system of claim 10, wherein the persistent store is a database operable to store faults encountered during the performance.

17. The system of claim 16, wherein the database is further operable to store the faults in a web service language.

18. The system of claim 10, wherein the service implementation is further operable to attach a unique identifier to each fault.

19. The system of claim 18, wherein the service implementation is further operable to direct the persistent store to store any faults according to the unique identifier.

20. The system of claim 10, wherein the at least one characteristic of the fault service consumer comprises a location of the fault service consumer.

21. The system of claim 10, wherein the at least one characteristic comprises a type of association of the fault service consumer with the system.

22. The system of claim 10, wherein the fault service interface is further to translate the fault information into a second language readable by the fault service customer.

23. A system for managing faults in a web service architecture comprising:
a hardware processor;
a web service module coupled to a network and operable to manage service requests in a web service language, the web service module to:
receive a service request from a first service consumer via a network, the service request received in the web service language; and
translate the service request into a non-web service language;
a diagnostic module to fulfill the service request and identify a fault associated with the service request;
a fault persistence module, executable by the hardware processor, to store fault information for the fault in a persistent store without responding to the fault; and
a fault service interface to, in response to a request from a fault service consumer, transmit a particular one of a plurality of different levels of the stored fault information to the fault service consumer, wherein the first service consumer and the fault service consumer are different entities, wherein the particular one of the plurality of different levels is selected based on one or more characteristics of the fault service consumer.

24. The system of claim 23, wherein the web service language is any protocol registered in the Universal Description Discovery and Integration registry.

25. The system of claim 23, wherein the web service language is a remote procedure call.

26. The system of claim 23, wherein the web service language is a HyperText Transfer Protocol.

27. The system of claim 23, wherein the web service language is an application service interface.

28. The system of claim 27, wherein the application service interface is Java message service.

29. The system of claim 23, wherein the web service language is a protocol approved as a web service description language approved by the World Wide Web Consortium.

30. The system of claim 23, wherein the persistent store is a database dedicated to the fault persistence module.

31. The system of claim 23, further comprising a sub-network coupled to the web service module.

32. The system of claim 31, further comprising at least one internal system, the at least one internal system coupled to the sub-network and operable to provide information required by the service request.

33. The system of claim 32, wherein the diagnostic module is further operable to identify any faults caused by the at least one internal system.

34. The system of claim 33, wherein the diagnostic module is further operable to communicate any faults to the fault persistence module.

35. The system of claim 34, wherein the fault persistence module is further operable to label each fault with a unique identifier.

36. The system of claim 35, wherein the fault persistence module is further operable to direct the persistent store to organize each fault by a unique identifier.

37. The system of claim 31, wherein the fault service consumer is coupled to the sub-network.

38. The system of claim 23, wherein the at least one characteristic of the fault service consumer comprises a type of association of the fault service consumer with the system.

39. The system of claim 23, wherein the at least one characteristic comprises a location of the fault service consumer.

40. The system of claim 23, wherein the fault service interface is further operable to translate the fault report into a second language readable by the fault service customer.

41. A system for managing faults in a web services architecture comprising:
   a hardware processor;
   a system interface to receive, from a first service consumer, a service request in a web services format, the system interface further to translate the service request into a non-web service format;
   a service implementation, executable by the hardware processor, to:
   fulfill the service request,
   generate a fault report relating to a fault, and
   persist the fault by storing the fault report in a persistent store without responding to the fault, wherein generating the fault report comprises detecting the fault during the fulfillment of the service request, and persisting the fault comprises attaching a unique identifier to the fault report; and
   a fault service implementation, executable by the hardware processor, to, in response to a request from a fault service consumer:
   retrieve the fault report from the persistent store,
   translate the fault report into a web service format, and
   transmit a particular one of a plurality of different levels of information in the translated fault report to the fault service consumer, wherein the first service consumer and the fault service consumer are different entities, wherein the particular one of the plurality of different levels of information is selected based on one or more characteristics of the fault service consumer.

42. The system of claim 41, wherein the at least one characteristic of the fault service consumer comprises a location of the fault service consumer.

43. The system of claim 41, wherein the at least one characteristic comprises an association of the fault service consumer with the system.

* * * * *